(12) United States Patent
Haub et al.

(10) Patent No.: US 8,737,992 B1
(45) Date of Patent: May 27, 2014

(54) METHOD AND APPARATUS FOR SIGNAL SCANNING FOR MULTIMODE RECEIVER

(71) Applicants: David Haub, San Diego, CA (US); Zhigang Xu, San Diego, CA (US)

(72) Inventors: David Haub, San Diego, CA (US); Zhigang Xu, San Diego, CA (US)

(73) Assignee: Spreadtrum Communication USA Inc., San Diego, CA (US)

( * ) Notice: Subject to any disclaimer, the term of this patent is extended or adjusted under 35 U.S.C. 154(b) by 0 days.

(21) Appl. No.: 13/691,973

(22) Filed: Dec. 3, 2012

(51) Int. Cl.
*H04W 48/12* (2009.01)

(52) U.S. Cl.
USPC .................. 455/434; 455/161.1; 455/161.3

(58) Field of Classification Search
USPC .............. 455/11.1, 13.3, 161.1, 161.3, 168.1, 455/205, 230, 266, 424, 425; 370/203, 208, 370/328, 338
See application file for complete search history.

(56) References Cited

U.S. PATENT DOCUMENTS

| | | | |
|---|---|---|---|
| 7,096,016 B2 | 8/2006 | Hasegawa | |
| 8,032,085 B2 * | 10/2011 | Mishali et al. | 455/59 |
| 8,457,579 B2 * | 6/2013 | Mishali et al. | 455/207 |
| 2006/0121946 A1 * | 6/2006 | Walton et al. | 455/561 |
| 2008/0039133 A1 * | 2/2008 | Ma et al. | 455/552.1 |
| 2008/0291974 A1 * | 11/2008 | Collados et al. | 375/130 |
| 2009/0154588 A1 * | 6/2009 | Chen et al. | 375/267 |
| 2011/0310870 A1 * | 12/2011 | Van Nee et al. | 370/338 |
| 2012/0076213 A1 * | 3/2012 | Zhang et al. | 375/259 |

OTHER PUBLICATIONS

Mitchell, B., "Vairable Bandwidth RSSI Scanning", Motorola Technical Developments, Motorola Inc., Aug. 1996, pp. 22-24.

\* cited by examiner

*Primary Examiner* — Cong Tran
(74) *Attorney, Agent, or Firm* — Duane Morris LLP

(57) ABSTRACT

In a signal processing method, an input signal is provided at an input to a receiver. A bandwidth of the receiver is controlled to a predetermined wideband setting. For band in a plurality of frequency bands, the input signal is processed at the receiver with a mixer, an amplifier, and a filter, to generate a first processed signal, and a power spectral density of the processed signal is generated over that frequency band, to provide a frequency domain signal for that frequency band. Based on the frequency domain signals corresponding to each frequency band in the plurality of frequency bands, a frequency domain representation of the processed signal is reconstructed over a reconstruction band having a bandwidth larger than the predetermined wideband setting. Based on the reconstructed frequency domain representation, a spectral component is identified corresponding to at least one cellular telephony access mode.

21 Claims, 10 Drawing Sheets

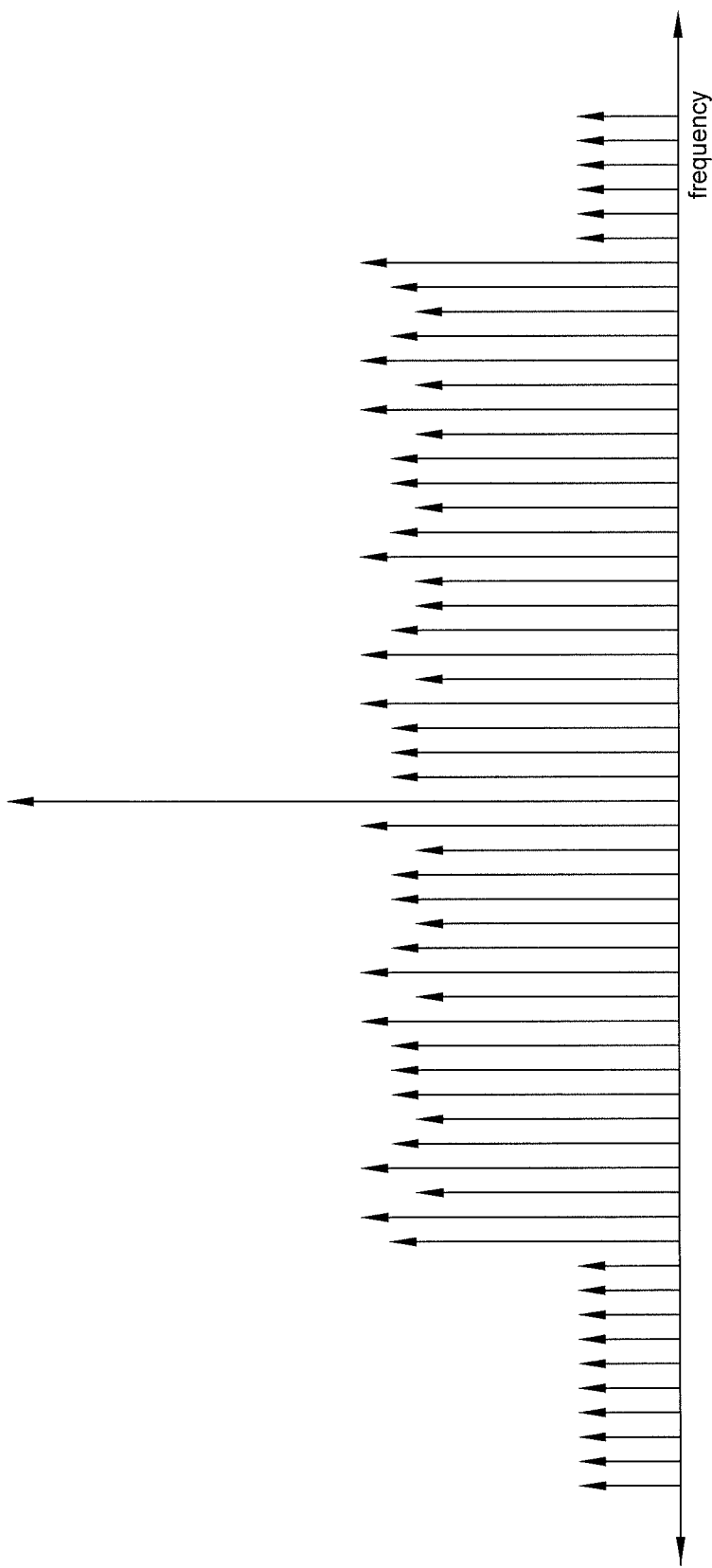

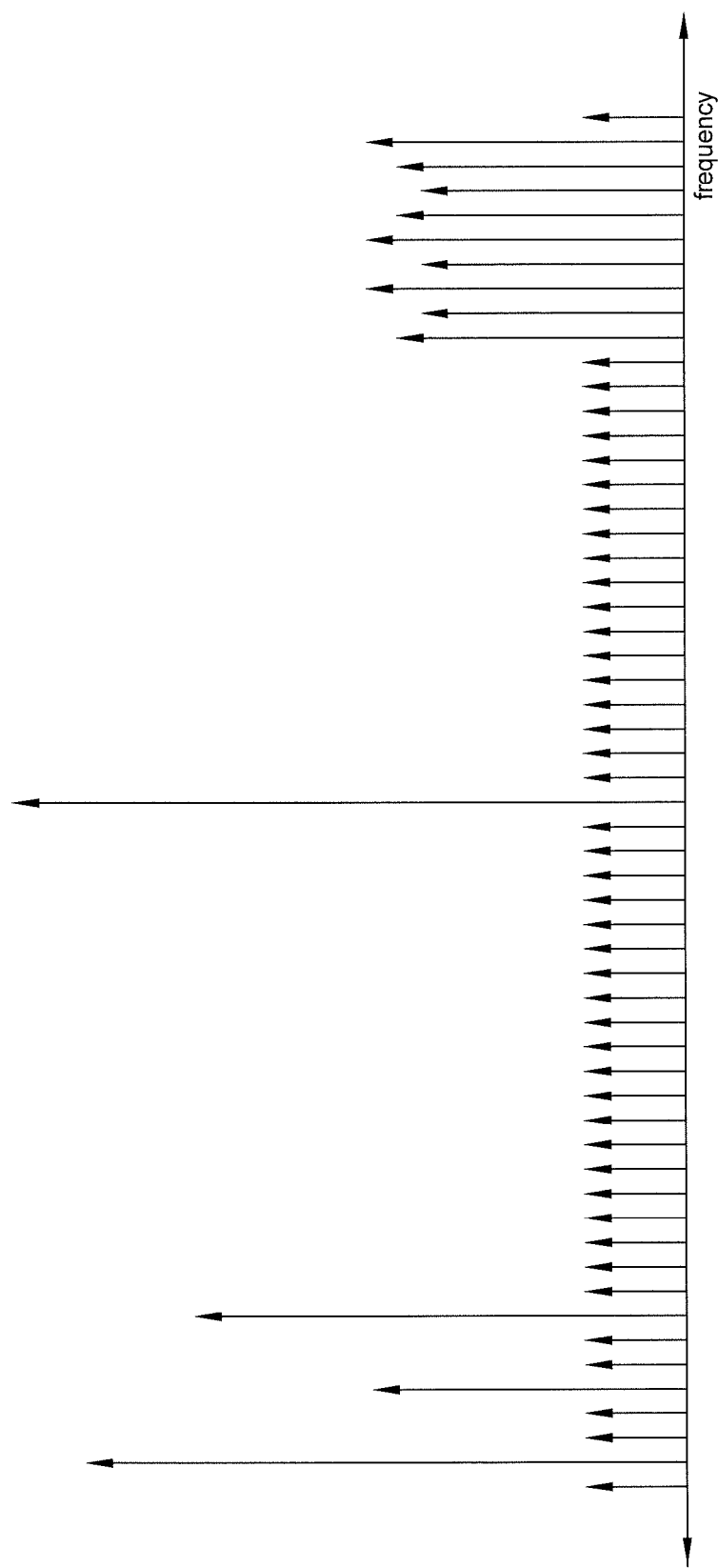

US 8,737,992 B1

METHOD AND APPARATUS FOR SIGNAL SCANNING FOR MULTIMODE RECEIVER

FIELD

The present disclosure relates to receiver architectures in a wireless communications system, and more particularly, some embodiments relate to methods and systems for scanning RF signals to identify cellular telephony access technologies used for communicating a signal wirelessly.

BACKGROUND

Wireless communications serve an increasingly important role in the modern world. The electromagnetic spectrum used for wireless cellular telephony is a valuable and limited resource. Consequently, many different types of cellular telephony access technologies (access modes) are being deployed in the available spectrum. Various known access modes utilize various parts of the spectrum. FIG. 1 illustrates an example multi-mode radio frequency (RF) band in which several different technologies might be deployed. In this example, RF band 100 contains spectral components 102, 104, 106, and 108 corresponding to the wide band LTE standard, the GSM standard, the narrow band LTE standard, and the time division synchronous code division multiple access (TD-SCDMA) standard, respectively. Other scenarios can also exist where the wideband code division multiple access (W-CDMA) and CDMA2000 1X standards are deployed.

Some conventional techniques that employ received signal strength indication (RSSI) measurements for signal scanning require all possible channels to be scanned, which can increase the time spent scanning for or synchronizing to candidate base stations. When multiple modes are deployed in RF band 100 as shown in FIG. 1, initial acquisition could be slow because each possible access mode needs to be scanned for the RF band 100. Conventional scanning techniques do not provide any indication of what type of access mode may be present in any particular frequency region. Even if it is known that a particular access mode is only deployed in a portion of the band, that entire portion would still need to be scanned to look for usable base stations. As a result of such issues, performance inefficiencies (e.g., decreased speed, increased power consumption) and/or increased cost are frequently encountered in conventional approaches.

SUMMARY

In some embodiments of the present disclosure, an input signal (e.g., signal 202) is provided (block 710) at an input to a receiver (e.g., receiver 200). A bandwidth of the receiver is controlled (block 720) to a predetermined wideband setting (e.g., 20 MHz as for each of WB1, WB2, WB3 in FIG. 3). For each of a plurality of frequency bands (e.g., WB1, WB2, WB3), blocks 730 and 740 are performed. At the receiver, the input signal is processed (block 730) with a mixer, an amplifier, and a filter, to generate a processed signal (e.g. signal 248a or signal 248b, or alternatively, signals 248a and 248b may together be considered the processed signal). A Fourier transform (e.g., FFT) of the processed signal is generated (block 740) over the particular frequency band, to provide a frequency domain signal for that frequency band. Based on the frequency domain signals corresponding to each frequency band in the plurality of frequency bands, a frequency domain representation of the processed signal is reconstructed (block 750) over a reconstruction band (e.g., band including regions 501, 502, 503, 504 of FIG. 5) having a bandwidth larger than the predetermined wideband setting. Based on the reconstructed frequency domain representation, a spectral component corresponding to at least one cellular telephony access mode is identified (block 760).

In some embodiments, a system includes a receiver, a power spectral density computation module, and a state machine. The receiver includes a mixer, an amplifier, a variable bandwidth filter, and a waveform synthesizer configured to synthesize a waveform at a variable frequency and provide the waveform to the mixer. The receiver is configured to receive an input signal at an input. The mixer, the amplifier, and the filter are disposed along a serial processing path and are configured to provide a processed signal corresponding to the input signal. The power spectral density computation module is configured to generate a Fourier transform of the processed signal over a selected frequency band, to provide a frequency domain signal for said frequency band. The selected frequency band is variable. The state machine is configured to reconstruct, based on plural frequency domain signals provided by the power spectral density computation module for respective bands in a plurality of frequency bands, a frequency domain representation of the processed signal over a reconstruction band having a bandwidth larger than the predetermined wideband setting, and is further configured to identify, based on the frequency domain representation, a spectral component corresponding to at least one cellular telephony access mode.

In some embodiments, a system includes a first receiver module and a second receiver module in a MIMO communications system, a power spectral density computation module, a received signal strength indication (RSSI) module, and a state machine. The first and second receiver modules are configured to process a first input signal and a second input signal, respectively. Each receiver module includes a mixer, an amplifier, and a variable bandwidth filter disposed along a serial processing path. The first and second receiver modules are configured to provide a first processed signal corresponding to said first input signal and a second processed signal corresponding to said second input signal, respectively. The power spectral density computation module is configured to generate a Fourier transform of said first processed signal over a selected frequency band, to provide a frequency domain signal for said frequency band. The selected frequency band is variable. The received signal strength indication (RSSI) module is configured to measure voltage or power of the second processed signal. The state machine has a first input coupled to an output of the power spectral density computation module and a second input coupled to an output of the RSSI module. The state machine is configured to reconstruct, based on frequency domain signals provided by the power spectral density computation module for respective bands in a plurality of frequency bands, a frequency domain representation of the first processed signal over a reconstruction band having a bandwidth larger than the predetermined wideband setting, and is further configured to identify, based on the frequency domain representation, a spectral component corresponding to at least one cellular telephony access mode.

BRIEF DESCRIPTION OF THE DRAWINGS

The following will be apparent from elements of the figures, which are provided for illustrative purposes and are not necessarily to scale.

FIGS. 4A-4C are plots of example FFT results from wideband scans in accordance with some embodiments.

DETAILED DESCRIPTION

This description of the exemplary embodiments is intended to be read in connection with the accompanying drawings, which are to be considered part of the entire written description.

Various embodiments of the present disclosure provide techniques for improving the time required to perform scans of RF signals for identification of usable base stations, thereby promoting faster synchronization to the relevant cellular telephony access mode (access technology). Also, embodiments provide the ability to skip scans or to change the priority of scans for particular access technologies in particular frequency regions in order to speed up the acquisition process.

Figure 2:
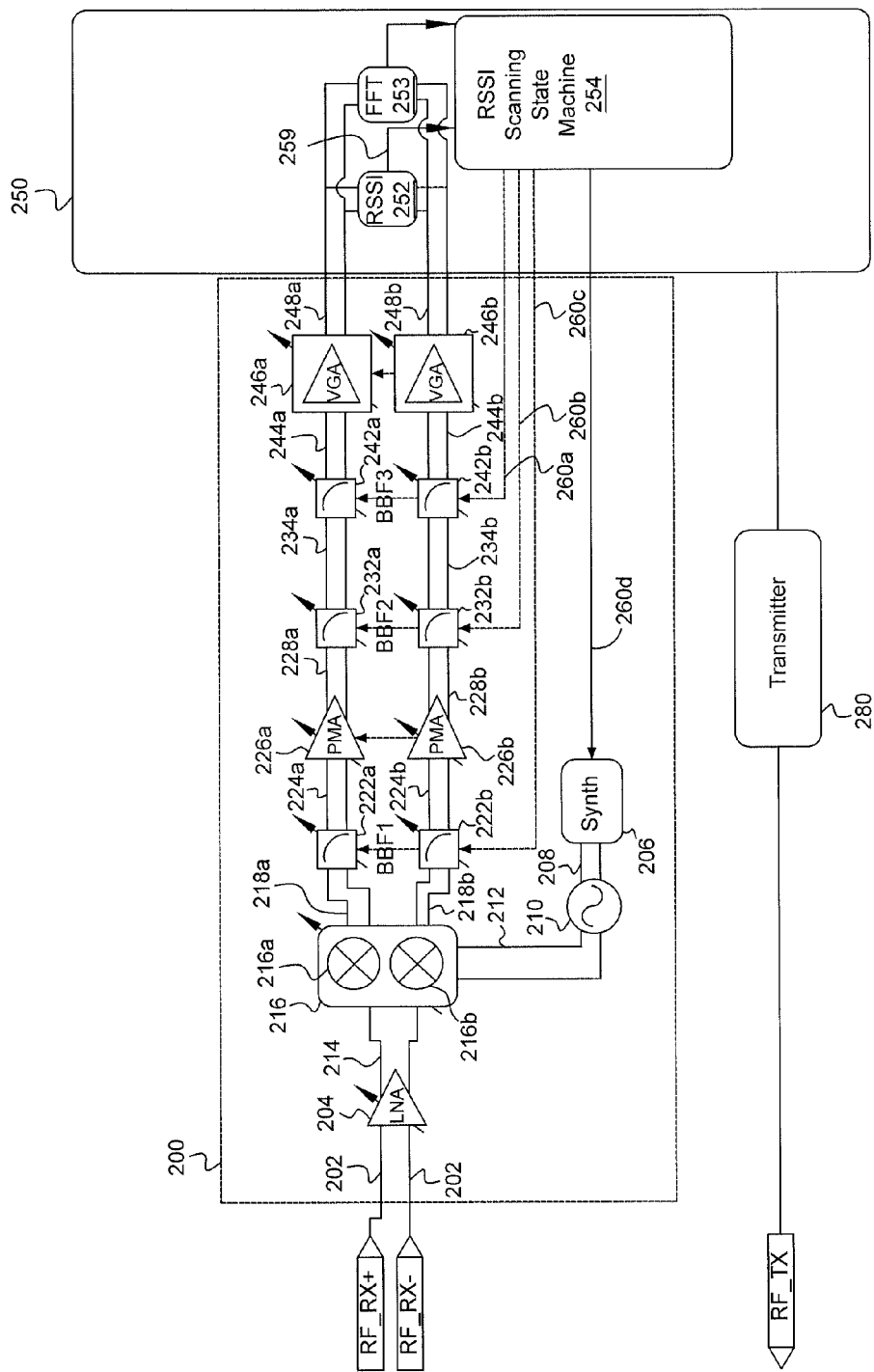
FIG. 2 is a receiver architecture diagram in accordance with some embodiments of the present disclosure.

FIG. 2 is a receiver architecture diagram in accordance with some embodiments of the present disclosure. A receiver 200 includes components configured to process an input signal 202 that is received, e.g., from an antenna. The input signal is shown in differential form (RF_RX+ and RF_RX−); other signals in FIG. 2 may be in differential form but are not labeled as such, for visual clarity and to reduce clutter. The input signal is amplified by a low noise amplifier (LNA) 204 to provide an amplified input signal 214. A local oscillator 210 generates one or more oscillator signals 212 (e.g., sinusoids) based on control signals 208 from a synthesizer 206. With the synthesizer and with variable bandwidth filter(s) as described below, receiver 200 is tunable to receive a signal at a desired frequency.

A mixer 216 mixes the amplified input signal 214 with the oscillator signal 212. The mixer may include 216a and 216b, one of which may process an in-phase component and one of which may process a quadrature component. Separate processing pathways are shown in FIG. 2 for the in-phase and quadrature components (with similar reference characters but different suffixes, "a" or "b"), but the processing is similar for each, so the discussion below focuses on the top pathway in FIG. 2, which may be an in-phase or quadrature path. It is to be understood that the various feedback effects from state machine 254 to filters may apply to filters in either the in-phase or quadrature path or using both.

Mixed signal 218a provided by mixer 216 is processed by a series of filters 222a, 232a, 242a, which may be baseband filters. These filters implement the overall interference rejection of the baseband, and they may have programmable bandwidths with many different settings. Although three stages of filters are shown in this example, various numbers of filters may be used. In some implementations, the filters provide progressively more rejection as one moves further toward the output (toward the right side of FIG. 2). Gain adjustment may be provided by a post-mixer amplifier (PMA) 226a and variable gain amplifier (VGA) 246a.

Thus, mixed signal 218 is filtered by filter 222a to provide signal 224a, which is amplified to provide signal 228a. The amplified signal 228a is filtered to provide signal 234a and then filtered to provide signal 244a, which is amplified to provide signal 248a, which is a processed signal provided by the receiver 200. It is understood that signal 248b is also such a processed signal provided by the receiver.

A logic module 250 includes a received signal strength indication (RSSI) module 252, which measures signal strength (e.g., power or voltage) and provides an output 259 to an RSSI scanning state machine 254. The state machine 254, which may be implemented with digital logic circuitry, controls the bandwidth of the receiver and the measurement channel (e.g., frequency). State machine 254 also receives an input provided by a power spectral density (PSD) computation module 253, which is used for baseband signal processing and which may implement a (PSD) computation, e.g., a fast Fourier transform (FFT), using known circuitry. State machine 254 uses the RSSI and FFT information from modules 252 and 253 as part of an algorithm for improved scanning. State machine 254 is coupled to a transmitter 280 that is configured to transmit signals so that the receiver and transmitter may function as a transceiver.

Figure 1:
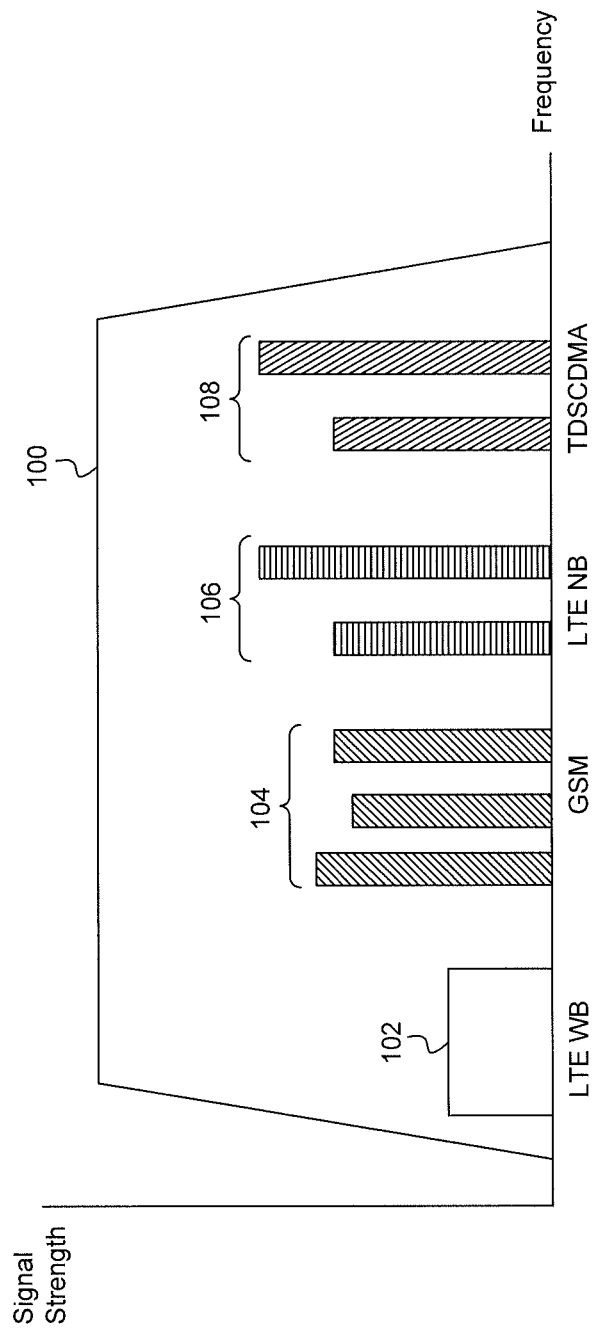
FIG. 1 is an illustration of an RF band with multiple deployed cellular telephony access modes.
Figure 3:
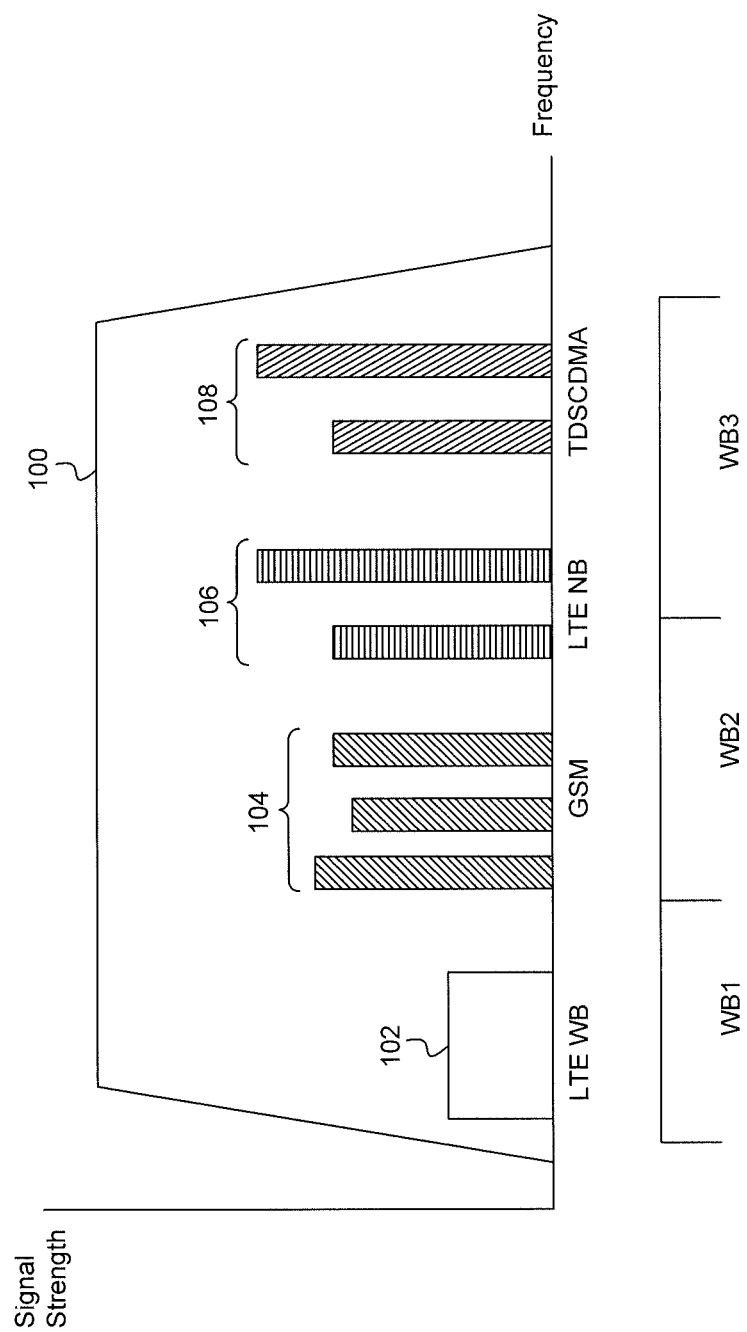
FIG. 3 is an illustration of example wideband scans in accordance with some embodiments.

The architecture shown in FIG. 1 provides improved scanning for base stations in a multi-mode environment. A wide bandwidth filter is used to perform a set of scans as shown in FIG. 3. In this example, the entire RF band is scanned by performing three measurements identified in FIG. 3 as WB1, WB2, and WB3. For example, a 60 MHz frequency band can be scanned with 3 measurements using a 20 MHz LTE baseband filter. These 3 scans may result in the FFT results shown in FIGS. 4A-4C for FFT with frequency resolution of 180 kHz. The value of 180 kHz may be used in some embodiments because it represents roughly the bandwidth of a typical narrowband GSM signal and it is the average of 12 FFT bins for the 15 kHz LTE spacing.

Figure 4C:
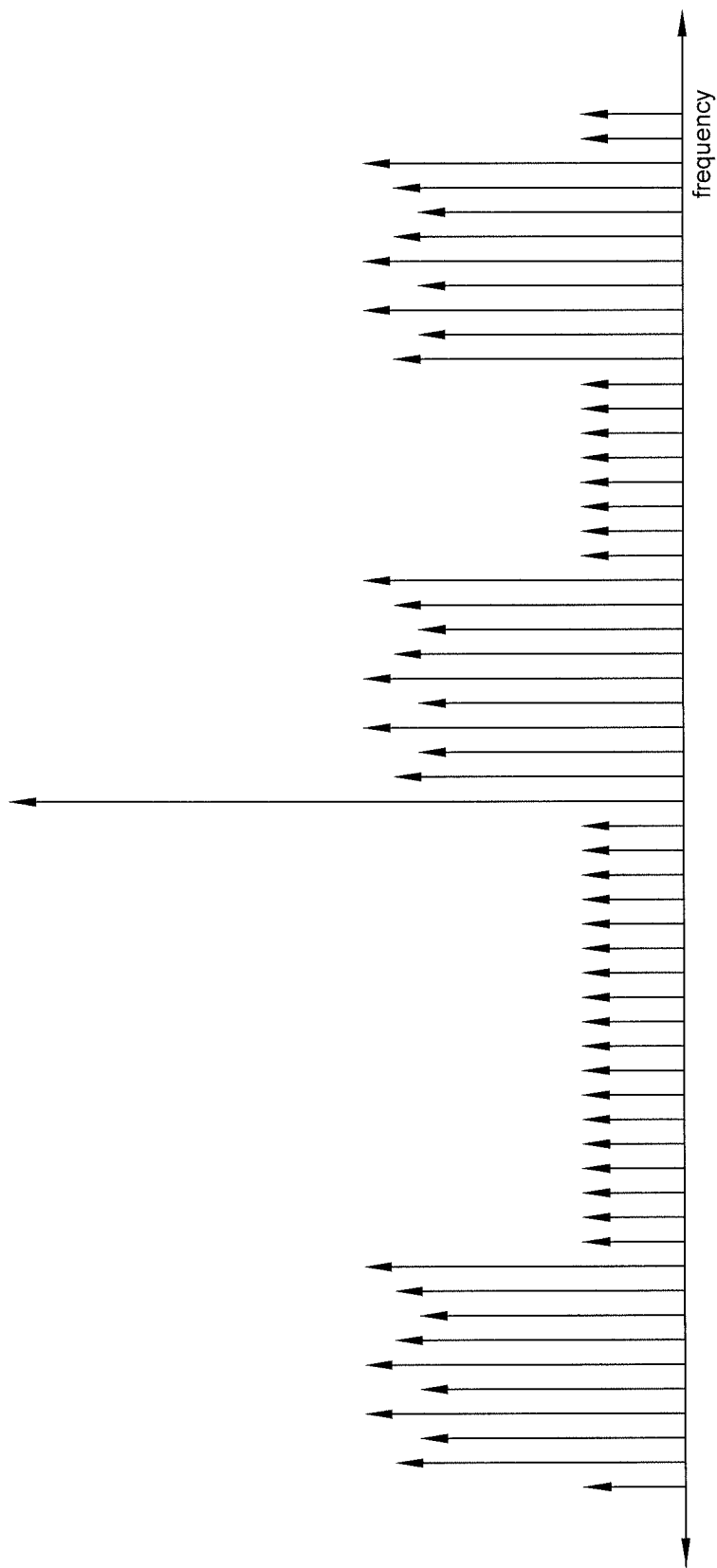

FIGS. 4A-4C are plots of example FFT results from wideband scans WB1, WB2, and WB3, respectively, in accordance with some embodiments. These results can be combined to provide an overall spectral estimation for the entire frequency range as shown in FIG. 5.

Figure 5:
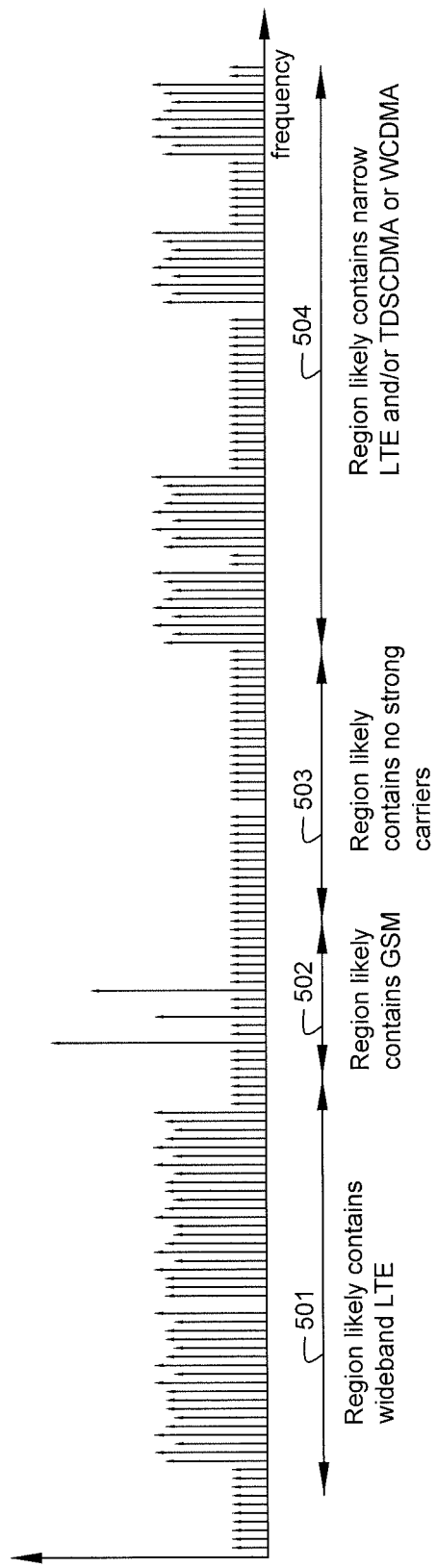
FIG. 5 is a plot showing reconstructed band power spectral density (PSD) in accordance with some embodiments.

FIG. 5 is a plot showing reconstructed band power spectral density (PSD) which is computed by combining the PSD results (e.g., FFT results) associated with the respective wideband scans WB1, WB2, and WB3. The reconstructed power spectral density is used to estimate both the power and the type of signals present (or likely present) in the RF band 100. For example, FIG. 5 shows region 501 that likely contains wideband LTE signal content; region 502 that likely contains GSM signal content; region 503 that likely contains no strong carriers; and region 504 that likely contains narrowband LTE and/or TD-SCDMA or W-CDMA. The methodology for making these determinations regarding regions 501, 502, 503, and 504 is described below.

Observations of relatively high signal power over numerous contiguous frequency bins may indicate the possible presence of wideband LTE such as 20 MHz LTE, and therefore the search for those signals can be limited to or minimally focused on a frequency region (frequency band) having such a large number of contiguous frequency bins. For example, region 501 may be identified as likely containing wideband LTE content on the basis of detecting a plurality of contiguous frequency bins (e.g., at least contiguous N bins, where N is a positive integer) each corresponding to a power higher than a predetermined threshold.

High signal power present in individual, isolated frequency bins (e.g., bins computed by an FFT) indicates high probability of a mode corresponding to a narrowband access technology such as GSM. So again, the search for GSM signals may be limited to or focused on the frequency region of interest. For example, region 502 may be identified as likely containing GSM content on the basis of detecting a one or more PSD spikes (e.g., three power spikes at respective, non-contiguous bins of region 502 in the example illustrated in FIG. 5), with each spike corresponding to a frequency bin having a power exceeding the power at respective neighboring bins by at least a predetermined threshold.

Region 503 may be identified as likely containing no strong carriers on the basis of determining low signal power in the corresponding frequency bins, e.g., in the case where none of the bins in that region has power exceeding a predetermined threshold.

Region 504 may be identified as likely containing narrowband LTE and/or TD-SCDMA or W-CDMA on the basis of identifying a specified number (e.g., a positive integer M) of contiguous bins (e.g., with M<N, where N was described above in the context of region 501) each corresponding to a power higher than a predetermined threshold.

A similar approach may be used to focus the search for particular access technologies in particular frequency regions. For example, various modes may be assigned respective priorities, and the modes may be searched in order of priority. Also, any region that seems devoid of any signal may either be skipped altogether or at least reprioritized based on this measurement result. For example, region 503 may be assigned a priority lower than some or all of regions 501, 502, 504 and then searched, or it may be skipped altogether.

Figure 6:
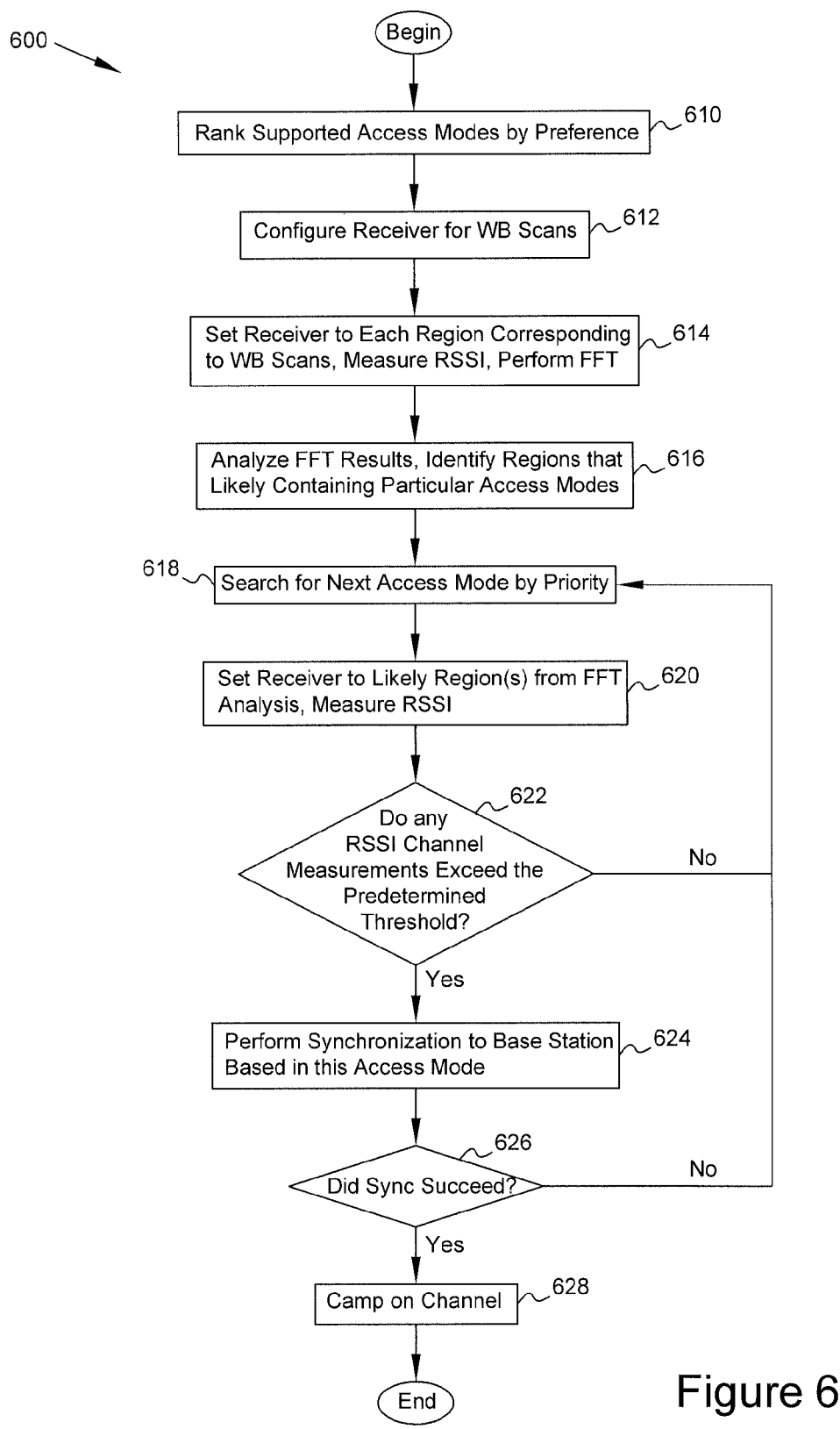
FIG. 6 is a flow diagram of a process in accordance with some embodiments.

FIG. 6 is a flow diagram of a process in accordance with some embodiments. After process 600 begins, various supported access modes are ranked by preference (block 610). For example, the ranking may be: 1. LTE 20 MHz; 2. LTE 5 MHz; 3. LTE 3 MHz; 4. TD-SCDMA; 5. GSM. A wide filter bandwidth (e.g., 20 MHz as in FIG. 3) is set to perform a scan over the various regions (block 620). The receiver 200 is set to each region corresponding a respective wideband scan, and a power spectral density (PSD) of a signal is computed (block 614), e.g., using a fast Fourier transform (FFT). The PSD results are analyzed with an algorithm that looks for certain patterns in the power spectral density. Various algorithms may be used to analyze the spectrum. Once the likely regions for particular access technologies are determined (block 616), an access mode is considered based on priority (block 618). This includes configuring the receiver to the bandwidth and operational state associated with receiving the particular access mode. Then, RSSI scanning is initiated (block 620). For a particular access technology, the RSSI scanning may start with the most likely frequency region based on the analysis of the power spectral density or possibly (e.g., if no likely region is found) the scan may be skipped or performed last. If the scan finds RSSI higher than a predetermined threshold (YES at block 622), a synchronization to a base station may be attempted (block 624). If either the scanning does not find any channels with "good" (sufficient) RSSI or if the synchronization fails (NO at block 626), then the next access mode in order of priority is checked (block 618). If synchronization succeeds (YES at block 626), the relevant channel may be "camped" on, i.e., maintained and used for subsequent communications.

If process 600 completes without achieving synchronization, a full search (on all possible channels) may be executed.

Figure 7:
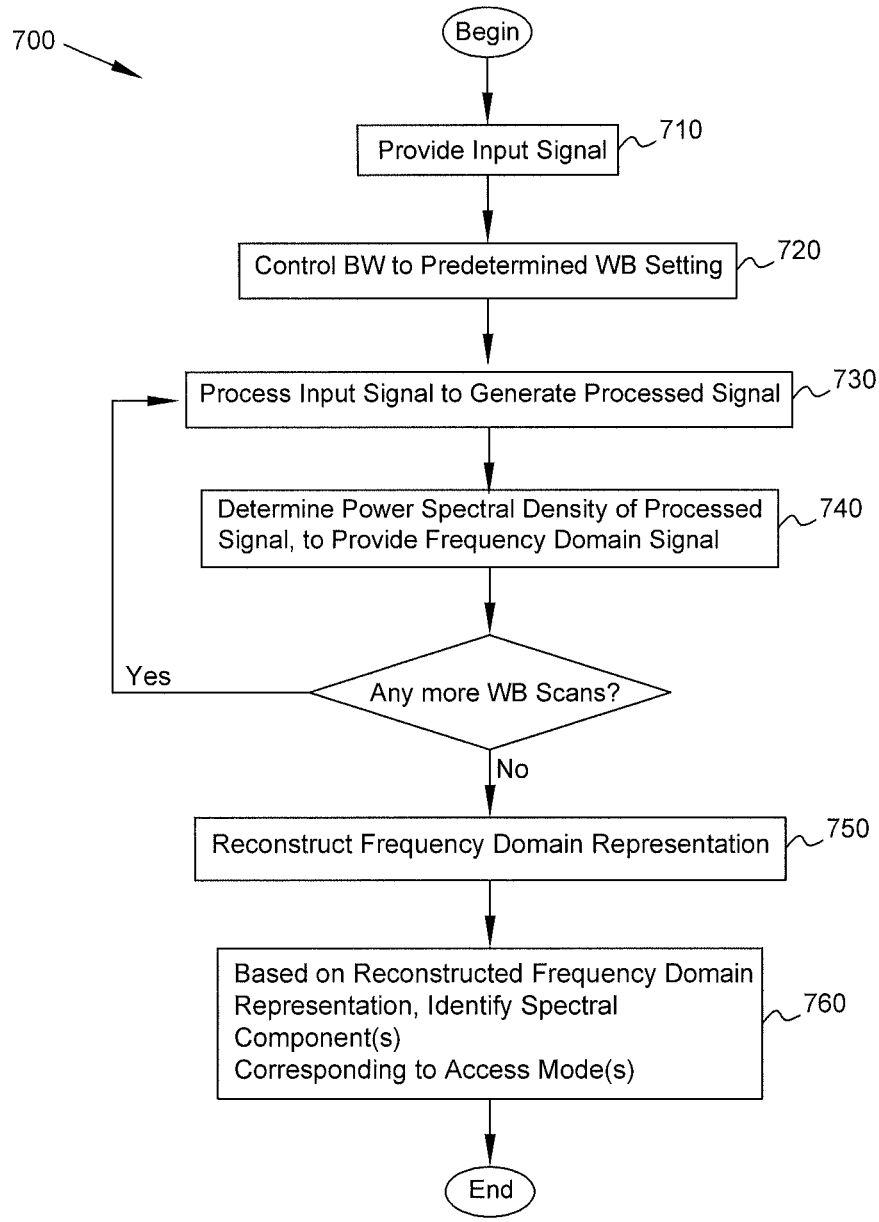
FIG. 7 is a flow diagram of another process in accordance with some embodiments.

FIG. 7 is a flow diagram of another process in accordance with some embodiments. After process 700 begins, an input signal (e.g., signal 202) is provided (block 710) at an input to a receiver (e.g., receiver 200). A bandwidth of the receiver is controlled (block 720) to a predetermined wideband setting (e.g., 20 MHz as for each of WB1, WB2, WB3 in FIG. 3). For each of a plurality of frequency bands (e.g., WB1, WB2, WB3), blocks 730 and 740 are performed. At the receiver, the input signal is processed (block 730) with a mixer, an amplifier, and a filter, to generate a processed signal (e.g. signal 248a or signal 248b, or alternatively, signals 248a and 248b may together be considered the processed signal). A power spectral density of the processed signal is generated (block 740) (e.g., using a fast Fourier transform) over the particular frequency band, to provide a frequency domain signal for that frequency band. Based on the frequency domain signals corresponding to each frequency band in the plurality of frequency bands, a frequency domain representation of the processed signal is reconstructed (block 750) over a reconstruction band (e.g., band including regions 501, 502, 503, 504 of FIG. 5) having a bandwidth larger than the predetermined wideband setting. Based on the reconstructed frequency domain representation, a spectral component corresponding to at least one cellular telephony access mode is identified (block 760).

Figure 8:
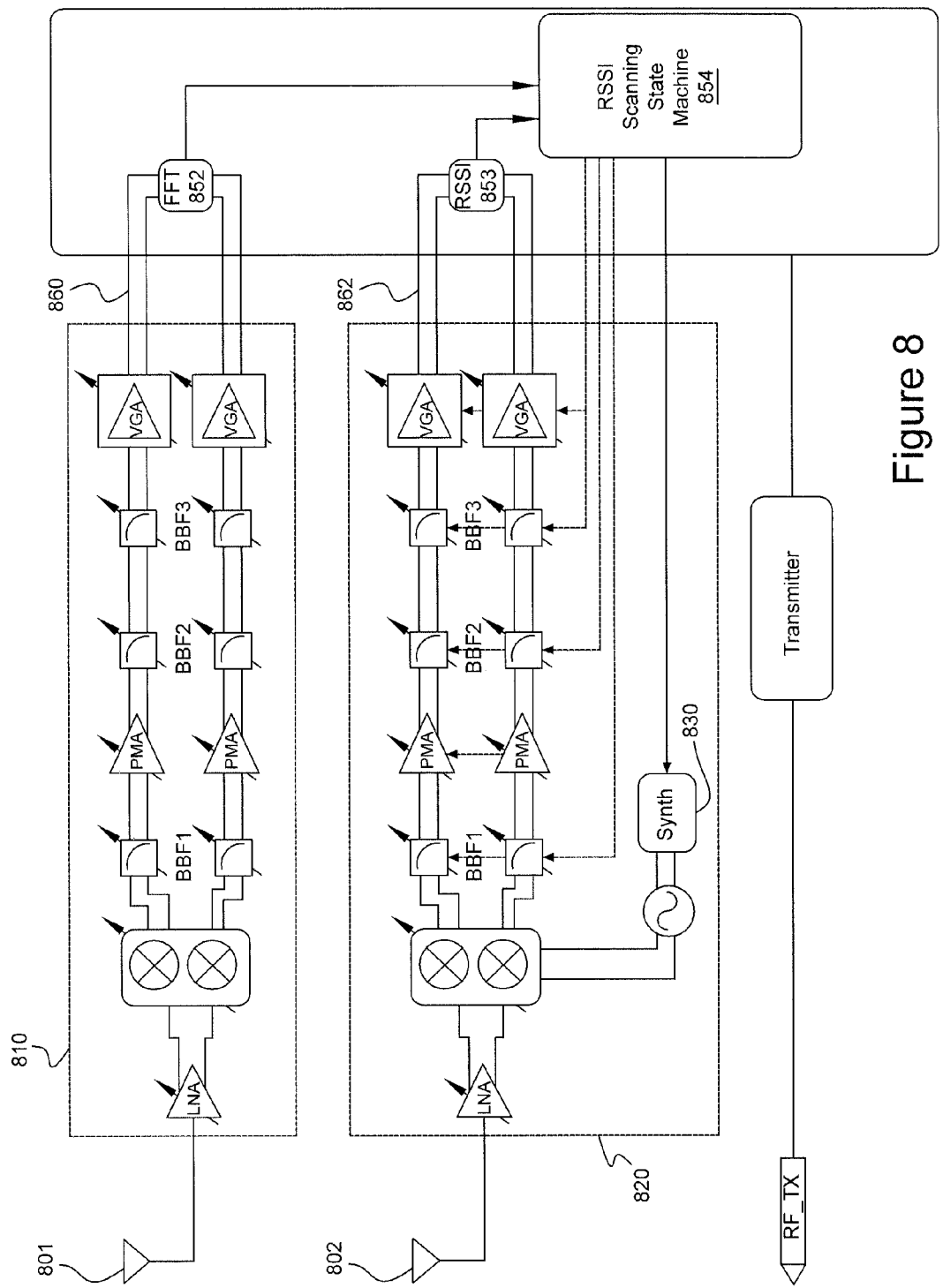
FIG. 8 is an architecture diagram of a multiple input/multiple output (MIMO) receiver in accordance with some embodiments.

FIG. 8 is an architecture diagram of a multiple input/multiple output (MIMO) receiver in accordance with some embodiments. A primary receiver module 820 and a diversity receiver module 810 are coupled to a primary antenna 802 and a diversity antenna 801, respectively. Each receiver module functions similarly as receiver 200, and only differences associated with the MIMO architecture are described herein for convenience. Primary receiver module 820, which is coupled to RSSI module 850, is used for normal scanning, and diversity receiver module 810, which is coupled to power spectral density computation module (e.g., FFT module) 852, is used for wideband scans. RSSI module 853 and FFT module 852 provide their outputs to state machine 854, which controls the frequency (via a control signal sent to synthesizer 830) and bandwidth of primary receiver module 820. The bandwidth of the diversity receiver module 810 may be controlled independently.

Although examples are illustrated and described herein, embodiments are nevertheless not limited to the details shown, since various modifications and structural changes may be made therein by those of ordinary skill within the scope and range of equivalents of the claims.

What is claimed is:

1. A method comprising:
providing an input signal at an input to a receiver;
controlling a bandwidth of the receiver to a predetermined wideband setting;
for each of a plurality of frequency bands:
at the receiver, processing the input signal with a mixer, an amplifier, and a filter, to generate a first processed signal, and
generating a power spectral density of the first processed signal over said frequency band, to provide a frequency domain signal for said frequency band;
reconstructing, based on the frequency domain signals corresponding to each frequency band in the plurality of frequency bands, a frequency domain representation of the processed signal over a reconstruction band having a bandwidth larger than the predetermined wideband setting; and
identifying, based on the reconstructed frequency domain representation, a spectral component corresponding to at least one cellular telephony access mode.

2. The method of claim 1, wherein determining the power spectral density of the first processed signal includes computing a fast Fourier transform of the first processed signal.

3. The method of claim 1, wherein each band in the plurality of frequency bands has a bandwidth equal to the predetermined wideband setting.

4. The method of claim 1, wherein spectral components corresponding to at least a first and a second cellular telephony access mode are detected, and the first mode is different from the second mode.

5. The method of claim 4, wherein the first mode is a wideband mode and the second mode is a narrowband mode.

6. The method of claim 5, wherein the first mode is an LTE mode and the second mode is a GSM mode.

7. The method of claim 1, wherein the at least one cellular telephony access mode includes a wideband mode identified by detecting a plurality of contiguous frequency bins each corresponding to a power higher than a predetermined threshold.

8. The method of claim 1, wherein the at least one cellular telephony access mode includes a narrowband mode identified by detecting a one or more power spectral density spikes, wherein each spike corresponds to a frequency bin having a power exceeding the power at respective neighboring bins by at least a predetermined threshold.

9. The method of claim 1, further comprising identifying, based on the reconstructed frequency domain representation, a carrier-free band containing no spectral components corresponding to any cellular telephony access modes, wherein the carrier-free band is within the reconstruction band.

10. The method of claim 1, wherein the bands in the plurality of frequency bands are contiguous bands.

11. The method of claim 1, further comprising:
configuring the receiver to a frequency band associated with one of the modes;
processing the input signal with the mixer, the amplifier, and the filter after the configuring, to generate a second processed signal;
measuring power or voltage of the second processed signal; and
if the measured power or voltage exceeds a predetermined threshold, synchronizing the receiver to a base station based on the frequency band associated with said one mode.

12. The method of claim 1, wherein the at least one cellular telephony access mode includes a plurality of modes, the method further comprising:
assigning a priority to each mode in the plurality of modes;
configuring the receiver to frequency bands associated with the respective modes based on the priority of each mode;
for each mode in order of priority:
processing the input signal with the mixer, the amplifier, and the filter after the configuring of the receiver to the corresponding frequency band, to generate a second processed signal corresponding to said mode;
measuring power or voltage of the second processed signal; and
if the measured power or voltage exceeds a predetermined threshold, synchronizing the receiver to a base station based on the frequency band associated with said mode.

13. The method of claim 12, further comprising:
identifying, based on the reconstructed frequency domain representation, a carrier-free band containing no spectral components corresponding to any cellular telephony access modes, wherein the carrier-free band is within the reconstruction band;
assigning to said carrier-free band a priority lower than all the priorities assigned to the respective modes in the plurality of modes;
configuring the receiver to said carrier-free band;
processing the input signal with the mixer, the amplifier, and the filter after the configuring of the receiver to said carrier-free band, to generate a second processed signal corresponding to said carrier-free band;
measuring power or voltage of said second processed signal corresponding to said carrier-free band; and
if the measured power or voltage of said second processed signal corresponding to said carrier-free band exceeds said predetermined threshold, synchronizing the receiver to a base station corresponding to said carrier-free band.

14. A system comprising:
a receiver including a mixer, an amplifier, a variable bandwidth filter, and a waveform synthesizer configured to synthesize a waveform at a variable frequency and provide the waveform to the mixer, wherein the receiver is configured to receive an input signal at an input, wherein the mixer, the amplifier, and the filter are disposed along a serial processing path and are configured to provide a processed signal corresponding to said input signal;
a power spectral density computation module configured to generate a power spectral density of said processed signal over a selected frequency band, to provide a frequency domain signal for said frequency band, wherein the selected frequency band is variable; and
a state machine configured to reconstruct, based on plural frequency domain signals provided by said power spectral density computation module for respective bands in a plurality of frequency bands, a frequency domain representation of said processed signal over a reconstruction band having a bandwidth larger than the predetermined wideband setting, and further configured to identify, based on said frequency domain representation, a spectral component corresponding to at least one cellular telephony access mode.

15. The system of claim 14, further comprising a received signal strength indication (RSSI) module configured to measure voltage or power of said processed signal.

16. The system of claim 14, wherein the state machine is further configured to control a bandwidth and frequency of the receiver.

17. The system of claim 16, further comprising a received signal strength indication (RSSI) module configured to measure voltage or power of said processed signal after said receiver is controlled to a bandwidth and frequency corresponding to one of the modes.

18. The system of claim 17, wherein said state machine is further configured to synchronize the receiver to a base station based on the frequency band associated with said one mode, if an output of said RSSI module is indicative of a voltage or power measurement exceeding a predetermined threshold.

19. A system comprising:
a first receiver module and a second receiver module in a multiple input multiple output (MIMO) communications system, the first and second receiver modules configured to process a first input signal and a second input signal, respectively, each receiver module including a mixer, an amplifier, and a variable bandwidth filter disposed along a serial processing path, the first and second receiver modules configured to provide a first processed signal corresponding to said first input signal and a second processed signal corresponding to said second input signal, respectively;

a power spectral density computation module configured to generate a power spectral density of said first processed signal over a selected frequency band, to provide a frequency domain signal for said frequency band, wherein the selected frequency band is variable;

a received signal strength indication (RSSI) module configured to measure voltage or power of said second processed signal; and a state machine having a first input coupled to an output of said power spectral density computation module and a second input coupled to an output of said RSSI module, said state machine configured to reconstruct, based on plural frequency domain signals provided by said power spectral density computation module for respective bands in a plurality of frequency bands, a frequency domain representation of said first processed signal over a reconstruction band having a bandwidth larger than the predetermined wideband setting, and further configured to identify, based on said frequency domain representation, a spectral component corresponding to at least one cellular telephony access mode.

20. The system of claim 19, wherein the second receiver module further comprises a waveform synthesizer configured to synthesize a waveform at a variable frequency and provide said waveform to the mixer of said second receiver module;

wherein said state machine is coupled to said filter of said second receiver module and to said synthesizer of said second receiver module and is configured to control a bandwidth and frequency of said second receiver module, and said RSSI module is configured to measure the voltage or power of said processed signal after said second receiver module is controlled to a bandwidth and frequency corresponding to one of the modes.

21. The system of claim 20, wherein said state machine is further configured to synchronize said second receiver module to a base station based on the frequency band associated with said one mode, if the output of said RSSI module is indicative of a voltage or power measurement exceeding a predetermined threshold.

* * * * *